(No Model.) 4 Sheets—Sheet 2.

C. C. PECK & W. H. CHAPMAN.
DYNAMO ELECTRIC GENERATOR.

No. 276,275. Patented Apr. 24, 1883.

Witnesses:
Walter E. Lombard.
Thomas Hibbard.

Inventors:
Charles C. Peck
Wm. H. Chapman
by N. C. Lombard
Attorney.

(No Model.) 4 Sheets—Sheet 3.

C. C. PECK & W. H. CHAPMAN.
DYNAMO ELECTRIC GENERATOR.

No. 276,275. Patented Apr. 24, 1883.

Witnesses:
Walter E. Lombard.
Thomas Hibbard.

Inventors:
Charles C. Peck
W<sup>m</sup> H. Chapman
by N. C. Lombard
Attorney.

(No Model.) 4 Sheets—Sheet 4.

C. C. PECK & W. H. CHAPMAN.
DYNAMO ELECTRIC GENERATOR.

No. 276,275. Patented Apr. 24, 1883.

Witnesses:
Walter E. Lombard.
Thomas Hibbard

Inventors:
Charles C Peck
Wm. H Chapman
by N. C. Lombard,
Attorney.

UNITED STATES PATENT OFFICE.

CHARLES C. PECK AND WILLIAM H. CHAPMAN, OF MIDDLEBURY, VERMONT.

DYNAMO-ELECTRIC GENERATOR.

SPECIFICATION forming part of Letters Patent No. 276,275, dated April 24, 1883.

Application filed August 30, 1882. (No model.)

*To all whom it may concern:*

Be it known that we, CHARLES C. PECK and WILLIAM H. CHAPMAN, both of Middlebury, in the county of Addison and State of Vermont, have invented certain new and useful Improvements in Electric Generators, of which the following, taken in connection with the accompanying drawings, is a specification.

Our present invention relates to an improvement in electric generators, the object of which is to make the generator compact and to diminish the amount of material needed in the construction of a machine of certain capacity, or, in other words, to increase the efficiency of a machine of certain dimensions. We accomplish this by means of a magnet, whose pole-pieces turn back toward each other, in combination with two armatures, whose ends are expanded inwardly toward each other, as hereinafter described, so that each armature may have an extent of contact with the magnetic poles nearly equal to the length of the magnet itself. The magnet may be permanent or electro. If an electro-magnet, it may be magnetized by a separate current, or by the current of the machine itself. For the purpose of maintaining a steady current two or more sets of armatures and magnets may be used. The electro-magnet may be connected into the circuit in multiple arc or in series, as shown.

Figure 1:
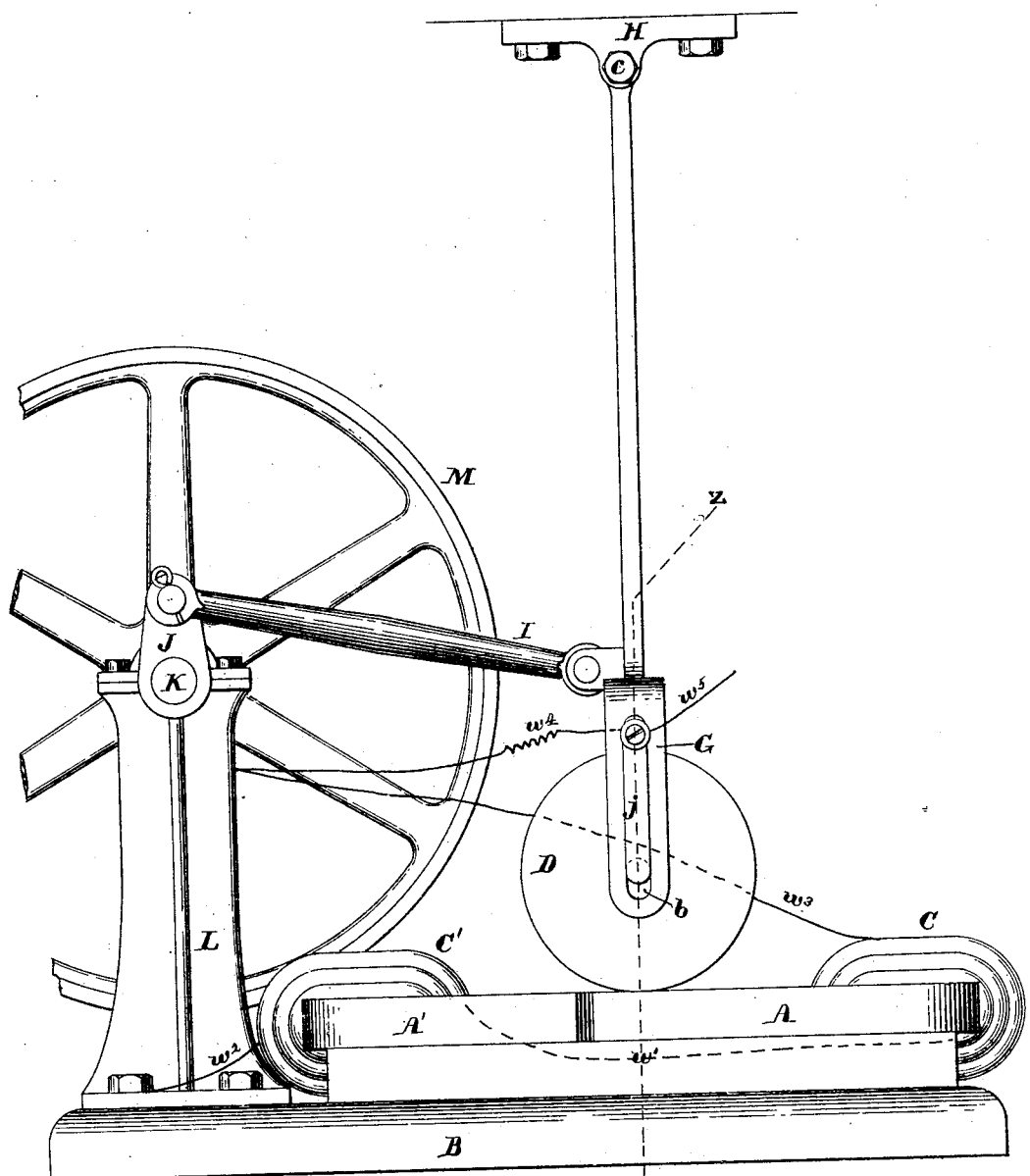
Figure 2:
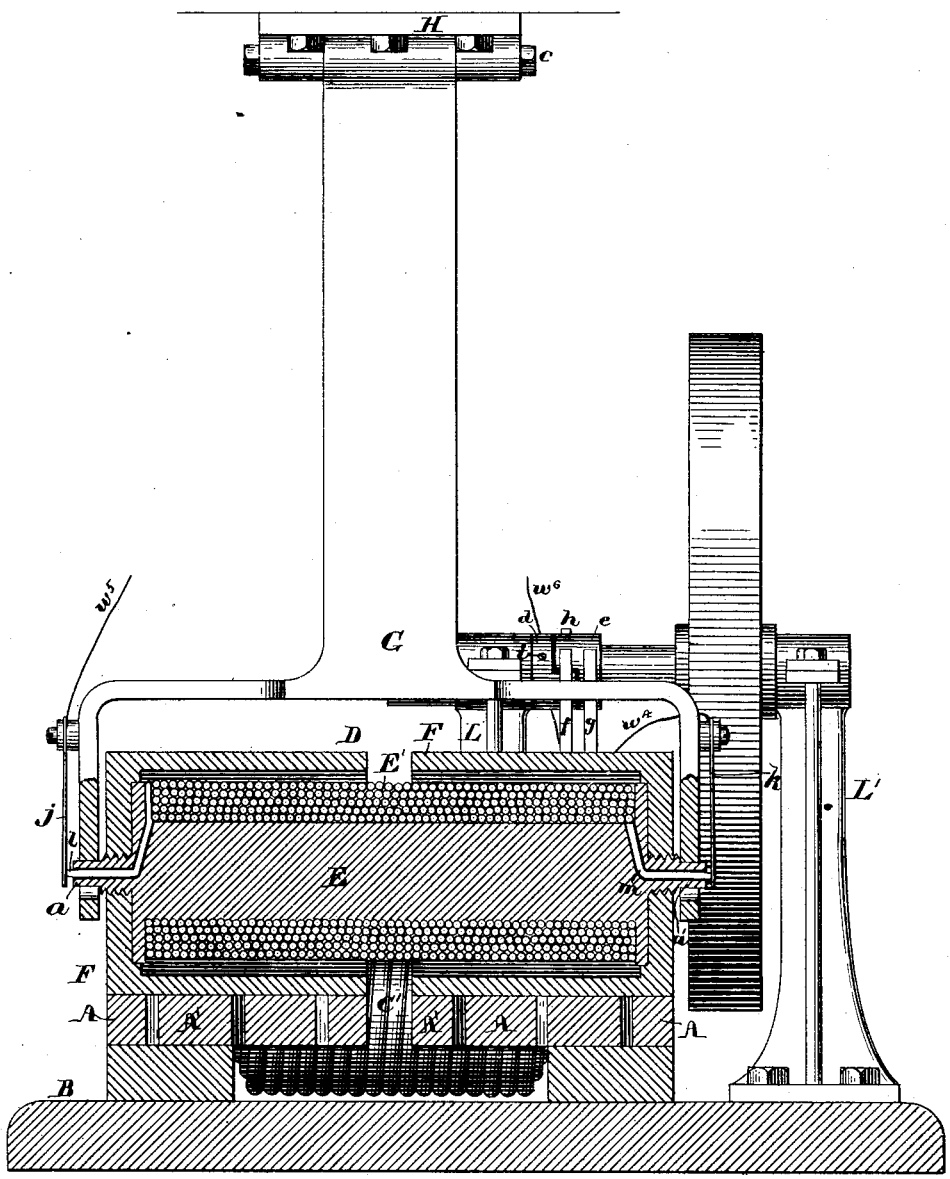
Figure 4:
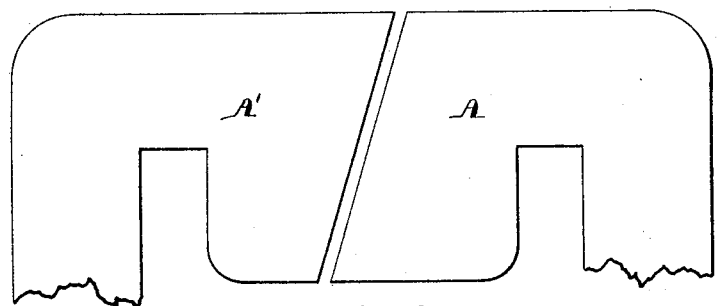
Figure 3:
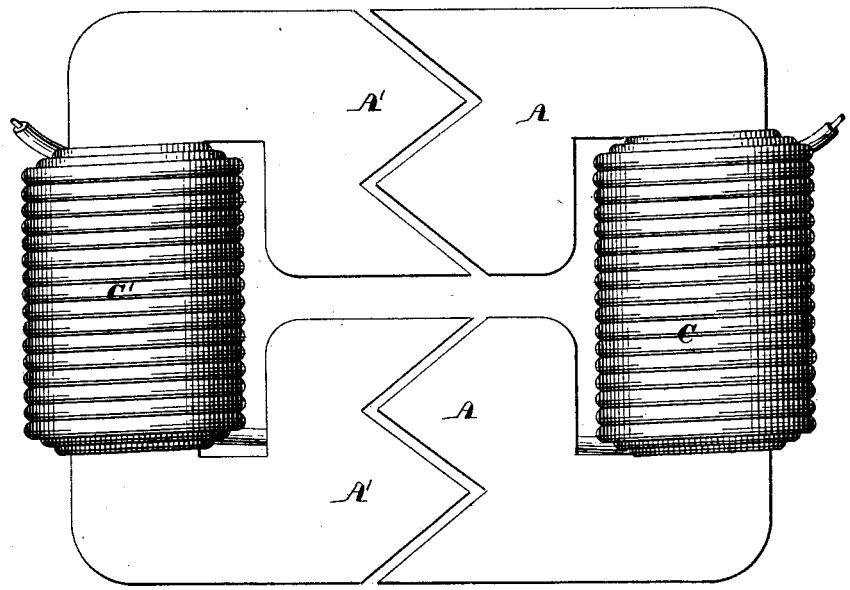
Figure 6:
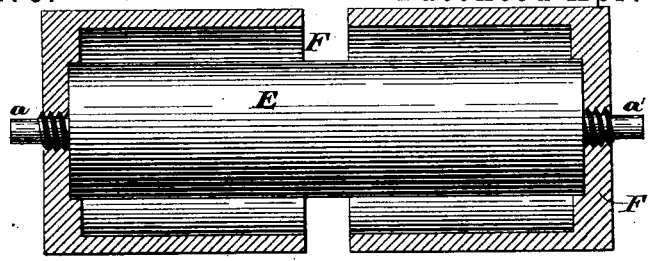
Figure 5:
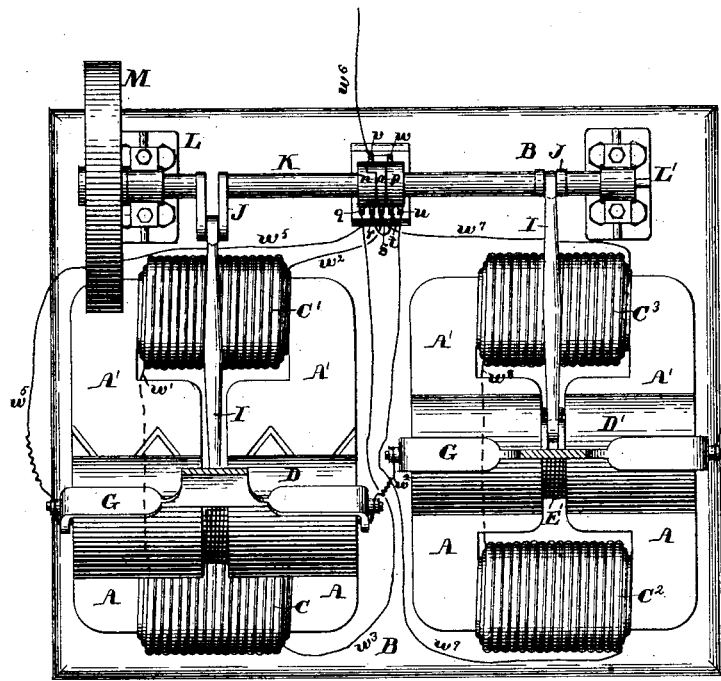

In the drawings, Figure 1 is an elevation of an electric generator embodying our present invention. Fig. 2 is a vertical section of the same on line *z z* on Fig. 1. Fig. 3 is a plan of the armatures and their conducting-coils. Fig. 4 is a detail showing a modified form of the armatures. Fig. 5 is a plan of a generator in which two sets of armatures and magnets are employed, and Fig. 6 is a sectional elevation of a modified form of the magnet.

In Figs. 1 and 2 are shown two soft-iron armatures, A and A', supported upon and secured to the bed B, and provided with the conducting-coils C and C', respectively.

D is a magnet adapted to rock or roll back and forth upon the upper surface of the armatures A A', between the coils C and C'. It may be either a permanent or an electro magnet; but in Figs. 1, 2, and 5 it is shown as being an electro-magnet composed of the soft-iron core E, surrounded by a coil of conducting-wire, E', and having secured upon its ends the soft-iron pole-pieces F F. These pole-pieces are shown as being screwed upon the short shanks or trunnions *a a'*, projecting from the ends of the core E; but they may be fixed in position in any suitable manner. They are made in the form of cups or flanged sleeves accurately fitted to the ends of the magnet E E', and extend backward, surrounding the same to near the middle of its length, but without touching the magnet, except at its ends. By this construction of the pole-pieces F F we secure great compactness of form and greater extent of contact-surface, making it nearly equal to the length of the magnet itself, this forming one of the principal features of our present invention.

The ends or poles of the armatures A A' are so formed as to overlap each other, as shown in Figs. 3 and 4, each armature having its ends beveled, as shown in Fig. 4, or being provided with one or more V-shaped projections, which extend between like projections upon the opposite armature, so that the pole-pieces F F will gradually increase or diminish the extent of contact as they roll back and forth upon said armatures, this construction being, however, described and claimed by us in another application of even date herewith. In Fig. 3 is also shown an improved form of armature, whereby we are enabled to increase the extent of contact-surface of the armatures A A', and at the same time secure compactness of form; and it consists in expanding the poles of said armatures by extending them inward toward each other between the coils C and C', and making them equal in width to the length of the pole-pieces F F of the magnet D.

The trunnions *a a'* are provided at their outer ends with journals, which have their bearings in slots *b b* in the lower ends of the forked pendent radius-arm G, pivoted at *c* to a suitable hanger, H. A vibrating motion is imparted to the radius-arm G by means of the connecting-rod I, and the crank J, secured upon the driving-shaft K. This driving-shaft has its bearings in the upper ends of two standards, L and L', secured upon the bed B, and is revolved by means of the driving-pulley M and a belt, (not shown,) or in any well-known manner.

A commutator of ordinary construction is employed, it consisting of the two bands *d* and $e$, surrounding the shaft K, and the three springs $f$, $g$, and $h$. The bands $d$ and $e$ are insulated from each other, the band $e$ being insulated from the shaft K, while the band $d$ is connected to said shaft by the set-screw $i$.

Two flat springs, $j$ and $k$, are secured, one to each side of the lower forked end of the radius-arm G, said springs being suitably insulated therefrom, the lower end of the spring $j$ pressing upon the end of the short wire $l$, which projects from the end of the trunnion $a$, and, passing through a hole therein, is connected to the outer end of the coil E', while the lower end of the spring $k$ presses upon the end of the wire $m$, which projects from the trunnion $a'$, and, passing through a hole in said trunnion, is connected to the inner end of the coil E'.

The outer end of the coil C' is connected by wire $w'$ to the inner end of the coil C, and the inner end of the coil C' is connected to the band $d$ by means of the wire $w^2$, standard L, shaft K, and set-screw $i$, while the outer end of the coil C is connected by wire $w^3$ with the spring $g$.

The inner end of the coil E' is connected by wire $m$, spring $k$, and wire $w^4$ to the spring $f$, while the outer end of said coil is connected by wire $l$, spring $j$, and wire $w^5$ to one end of the line or circuit, the other end of the circuit being connected by wire $w^6$ with the spring $h$.

The operation of the machine may be readily understood from the foregoing description, and requires no further explanation here.

In Fig. 5 is shown a plan of a machine employing two sets of armatures and magnets for the purpose of generating a steady current. The commutator in this machine is composed of the bands $n$, $o$, and $p$, surrounding the shaft K and insulated therefrom and from each other, and the springs $q$, $r$, $s$, $t$, $u$, $v$, and $w$. The inner end of the coil C is connected by wire $w'$ to the outer end of the coil C', and the outer end of the coil C is connected by wire $w^3$ to the spring $q$. The inner end of the coil C' is connected by wire $w^2$ to the spring $s$, which is also connected by wire $w^7$ to the inner end of the coil C³, the outer end of which is connected by wire $w^8$ to the inner end of the coil C², and the outer end of the coil C² is connected by wire $w^9$ to the spring $u$. The outer end of the coil of the magnet D is connected by wire $w^5$ to the spring $r$, which is also connected by a short wire or otherwise to the spring $t$. The inner end of the coil of the magnet D is connected by wire $w^4$ to the outer end of the coil of the magnet D'. The spring $w$ is connected by a short wire to the spring $v$, which is also connected by wire $w^6$ to one end of the circuit, the other end of the circuit being connected by wire $w^{10}$ to the inner end of the coil of the magnet D'.

A steady current could also be produced with a single set of armatures and a magnet by using a storage-battery in connection with the machine. This would have the same effect as an air-chamber on a hydraulic pump.

In the magnet illustrated in Fig. 6 the core E is permanently magnetized and the coil E' is dispensed with, as are also the wires $l$ and $m$ and the springs $j$ and $k$, the magnet not requiring to be connected with the circuit.

What we claim as new, and desire to secure by Letters Patent of the United States, is—

1. Two soft-iron armatures having their ends constructed and arranged to overlap or project by each other and provided with conducting-coils, in combination with an electro-magnet constructed and arranged to rock or roll from one armature to the other in contact therewith, substantially as described.

2. The combination, with two soft-iron armatures provided with conducting-coils, of a magnet composed of a central core, and two soft-iron pole pieces in the form of cups or flanged sleeves secured to the ends of said core, and surrounding and inclosing a portion of the length thereof without touching it except at its ends, substantially as described.

3. The combination, with two soft-iron armatures provided with conducting-coils, of an electro-magnet composed of a soft-iron core, a coil of conducting-wire surrounding said core, and two pole-pieces in the form of cups or flanged sleeves secured to said core at its ends, and each surrounding and inclosing a portion of the length of said core and coil, substantially as and for the purposes described.

4. The combination of two soft-iron armatures provided with conducting-coils, and having their ends constructed and arranged to overlap or project by each other, an electro-magnet composed of a soft-iron core, a coil of conducting-wire surrounding said core, and two pole-pieces in the form of cups or flanged sleeves secured to said core at its ends, and each surrounding and inclosing a portion of the length of said core and coil, substantially as and for the purposes described.

5. In combination with a magnet composed of a central core and two pole-pieces in the form of cups or flanged sleeves, each inclosing a portion of said core without touching its periphery, two soft-iron armatures provided with conducting-coils, and each having its ends expanded inwardly, substantially as and for the purposes described.

In testimony whereof we have signed our names to this specification, in the presence of two subscribing witnesses, on this 24th day of August, A. D. 1882.

CHARLES C. PECK.
WILLIAM H. CHAPMAN.

Witnesses:
CHARLES E. PINNEY,
GEO. M. FLETCHER.